United States Patent
Rat et al.

(10) Patent No.: US 10,733,045 B2
(45) Date of Patent: Aug. 4, 2020

(54) ONLINE REPAIR OF METADATA FOR STRUCTURED DATA INCLUDING FILE SYSTEMS

(71) Applicant: Microsoft Technology Licensing, LLC, Redmond, WA (US)

(72) Inventors: Cornel Rat, Redmond, WA (US); Chesong Lee, Bellevue, WA (US); Rajsekhar Das, Seattle, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 390 days.

(21) Appl. No.: 15/277,089

(22) Filed: Sep. 27, 2016

(65) Prior Publication Data
US 2018/0018218 A1    Jan. 18, 2018

Related U.S. Application Data

(60) Provisional application No. 62/362,540, filed on Jul. 14, 2016.

(51) Int. Cl.
| | | |
|---|---|---|
| G06F 11/10 | (2006.01) | |
| G06F 3/06 | (2006.01) | |
| G06F 11/08 | (2006.01) | |
| G06F 11/14 | (2006.01) | |

(52) U.S. Cl.
CPC .......... *G06F 11/1004* (2013.01); *G06F 3/064* (2013.01); *G06F 3/0619* (2013.01); *G06F 3/0631* (2013.01); *G06F 3/0673* (2013.01); *G06F 11/08* (2013.01); *G06F 11/1435* (2013.01); *G06F 11/1446* (2013.01)

(58) Field of Classification Search
None
See application file for complete search history.

(56) References Cited

U.S. PATENT DOCUMENTS

| | | |
|---|---|---|
| 6,208,999 B1 | 3/2001 | Spilo et al. |
| 8,037,345 B1 | 10/2011 | Iyer et al. |
| 8,407,265 B1 | 3/2013 | Scheer et al. |
| 8,495,111 B1 | 7/2013 | Wang et al. |

(Continued)

FOREIGN PATENT DOCUMENTS

| | | |
|---|---|---|
| EP | 1594062 A2 | 11/2005 |
| WO | 2015116023 A1 | 8/2015 |

OTHER PUBLICATIONS

"International Search Report and Written Opinion Issued in PCT Application No. PCT/US2017/040571", dated Oct. 10, 2017, 15 Pages.

(Continued)

*Primary Examiner* — Phung M Chung

(57) ABSTRACT

Embodiments described herein relate to testing the integrity of a storage system's metadata while corresponding structured data remains online. Embodiments also relate to enabling corrupt storage system metadata to be repaired while the metadata remains in use and while its structured data remains online. Corruption detection and repair is described with respect to allocation metadata and reference count metadata. The embodiments are applicable to many types of storage systems, including file systems and databases, for example.

15 Claims, 10 Drawing Sheets

(56) References Cited

U.S. PATENT DOCUMENTS

| | | | |
|---|---|---|---|
| 8,554,741 B1 * | 10/2013 | Malina | G06F 11/14 |
| | | | 707/674 |
| 8,607,099 B2 | 12/2013 | Havewala et al. | |
| 8,612,382 B1 | 12/2013 | Patel et al. | |
| 8,856,090 B1 * | 10/2014 | Honner | G06Q 10/087 |
| | | | 707/697 |
| 9,043,280 B1 | 5/2015 | Patwardhan | |
| 9,152,353 B1 | 10/2015 | Wang et al. | |
| 9,542,401 B1 * | 1/2017 | Veeraswamy | G06F 16/128 |
| 9,606,865 B2 * | 3/2017 | Yang | G06F 11/1068 |
| 2012/0221533 A1 | 8/2012 | Burness et al. | |
| 2014/0164330 A1 | 6/2014 | Barnes et al. | |
| 2014/0201163 A1 | 7/2014 | Tipton et al. | |
| 2014/0297604 A1 | 10/2014 | Brand | |
| 2014/0317065 A1 | 10/2014 | Barrus | |
| 2015/0220439 A1 | 8/2015 | Mickens et al. | |
| 2016/0011811 A1 | 1/2016 | Garson et al. | |

OTHER PUBLICATIONS

"What fsck Checks and Tries to Repair", Published on: Nov. 6, 2012 Available at: https://docs.oracle.com/cd/E19455-01/805-7228/6j6q7uf0e/index.html.

"Mmfsck command—Checks and repairs a GPFS7m file system", Retrieved on: Jul. 7, 2014 Available at: https://www.ibm.com/support/knowledgecenter/STXKQY_4.2.0/com.ibm.spectrum.scale.v4r2.adm.doc.bl1adm_mmfsck.htm.

Schmuck, et al., "GPFS: A Shared-Disk File System for Large Computing Clusters", In Proceedings of the Conference on File and Storage Technologies, Jan. 28, 2002, 14 pages.

* cited by examiner query of sparse allocation index

124A

| D | | | | | |
|---|---|---|---|---|---|
| 4 | | 5 | | 6 | |
| offset | length | offset | length | offset | length |
| 2 | 3 | 1 | 8 | 0 | 0 |
| 7 | 1 | | | | |

FIG. 5

ONLINE REPAIR OF METADATA FOR STRUCTURED DATA INCLUDING FILE SYSTEMS

BACKGROUND

Computers are used to store and organize data. Stored data may be structured and managed with many objectives, some conflicting. For example, data may be structured and managed for reliability and integrity, efficient reading and writing, efficient searching, minimal waste of the underlying storage, ease of management, minimal computational overhead, and so forth. The particular algorithms and strategies that may be used to structure and manage any particular data often depend on which of these objectives are most important for the use of that data. As discussed below, algorithms and techniques that can improve any of these objectives without significantly undermining other objectives are desirable. Before discussing some shortcomings and improvements in the field of structured data storage, some terminology will be established.

A common data storage scenario involves a storage system layering structured data on an underlying block-based storage unit. There are many kinds of block-based storage units. For instance, disk drives, logical and physical file system volumes, memory, virtualized storage devices, database page files, block-based cloud storage systems, and so forth. Block-based storage units are referred to herein as "storage units", with the understanding that the term refers to any type of discrete unit of storage, physical or virtual, that is able to store structured data within its discrete blocks, pages, clusters, or other generally segmented into uniform sub-units of storage, which will be referred to herein as "blocks". Usually, the blocks of a storage unit are contiguous, their size is aligned with the size of their storage unit, and they are discretely written to and read from their storage unit. Note that a block can also be a byte of a byte-addressable storage (DAX).

The term "storage system" is used herein to refer to any computer-executable system that organizes and manages structured data ("data") within the blocks of a storage unit, where the data is structured for retrieval, updating, deletion, etc., by the storage system. "Structured data" will refer to the data abstraction provided by a storage system and layered on top of a storage unit. Typically, structured data is stored in objects (data types, items, sub-structures, etc.) defined and implemented by the storage system. Objects typically store data that is passed into the storage system (e.g., "user data" or "client data") as well as management metadata generated and used by the storage system. A storage system usually maintains "storage metadata" on a storage unit to logically arrange the storage unit's objects and perhaps track properties of the objects (i.e., object metadata). Storage systems also store and manage global metadata for a storage unit. A storage unit's global metadata may include data about the storage unit itself, for instance its size (or location and extent), layout, block size, properties, access credentials or keys, global information about the structured data per se, and so forth. For efficiency, global and storage metadata (collectively, "metadata") are often stored in trees. Often, a root piece of global metadata points to other units of global metadata.

File systems are one type of structured data. In terms of file systems, a file system manager is an example of a storage manager. A volume, whether physical or logical, is an example of a storage unit consisting of blocks (i.e., nodes, clusters, etc.). A file system is an example of structured data managed by a file system manager, which is usually included as part of the storage stack of an operating system. Objects of a file system typically include files, directories, links, access control lists, and others. Storage metadata provides the hierarchical structure of a file system. Global metadata of a file system or volume may include information about which blocks are allocated, counts of references to objects in the file system, the number of blocks and their size, properties of the volume, etc. All of this file system information is overlaid on the blocks of the volume and is managed by the file system manager.

Databases are another type of structured data. In terms of databases, a database engine is an example of storage system. A page file consisting of pages (i.e., blocks) is an example of a storage unit managed by a database engine. A database is an example of structured data overlaid on the pages of the page file, and the objects of a database typically consist of tables, records, indexes, schemas, security information. Global metadata may include information about which pages are allocated, which objects are stored at which locations of which pages, and so forth.

With this terminology in mind, consider that most storage systems allow updating of their structured data; they enable objects to be added, removed, and modified. Therefore, most storage systems have some mechanism for, for a given storage unit, tracking which blocks of the storage unit are currently allocated, i.e., which blocks are in use to store global metadata, storage metadata, objects, object metadata, or any other information. Because allocating blocks, deallocating blocks, and querying for block allocation states are frequent operations of storage systems, a storage system's performance may be limited by how quickly these allocation operations can be performed. For speed, storage systems generally use some form of index (a type of global metadata) to track block allocation states. Recently, trees such as B-trees and B+ trees have been favored due in part to their fast search times and other advantages. In any case, often, the more efficient an index, the more vulnerable the index may be to corruption. For some types of indexes, one erroneous bit might cause a storage system to consider an entire corresponding storage unit to be corrupt and unusable. Described below are techniques for detecting corruption in allocation indexes and repairing corrupt allocation indexes while the related structured data and storage unit remain online and continues to be made available by the corresponding storage system.

Many storage systems also track how many references are currently active for the objects in a storage unit. For instance, a file system may have a tree of reference counts maintained by a file system manager to track how many references are active for objects in the file system. Described below are techniques for monitoring the integrity of global reference counts while corresponding structured data remains online, and, while the structured data remains online, repairing the reference counts in a way that allows the structured data to remain online.

Other techniques for improving the availability and robustness of structured data, in particular storage metadata and global metadata are also described below.

SUMMARY

The following summary is included only to introduce some concepts discussed in the Detailed Description below. This summary is not comprehensive and is not intended to delineate the scope of the claimed subject matter, which is set forth by the claims presented at the end.

Embodiments described herein relate to testing the integrity of a storage system's metadata while corresponding structured data remains online. Embodiments also relate to enabling corrupt storage system metadata to be repaired while the metadata remains in use and while its structured data remains online. Corruption detection and repair is described with respect to allocation metadata and reference count metadata. The embodiments are applicable to many types of storage systems, including file systems and databases, for example.

Many of the attendant features will be explained below with reference to the following detailed description considered in connection with the accompanying drawings.

BRIEF DESCRIPTION OF THE DRAWINGS

The present description will be better understood from the following detailed description read in light of the accompanying drawings, wherein like reference numerals are used to designate like parts in the accompanying description.

FIG. 5 shows allocation map extents.

DETAILED DESCRIPTION

Figure 1:
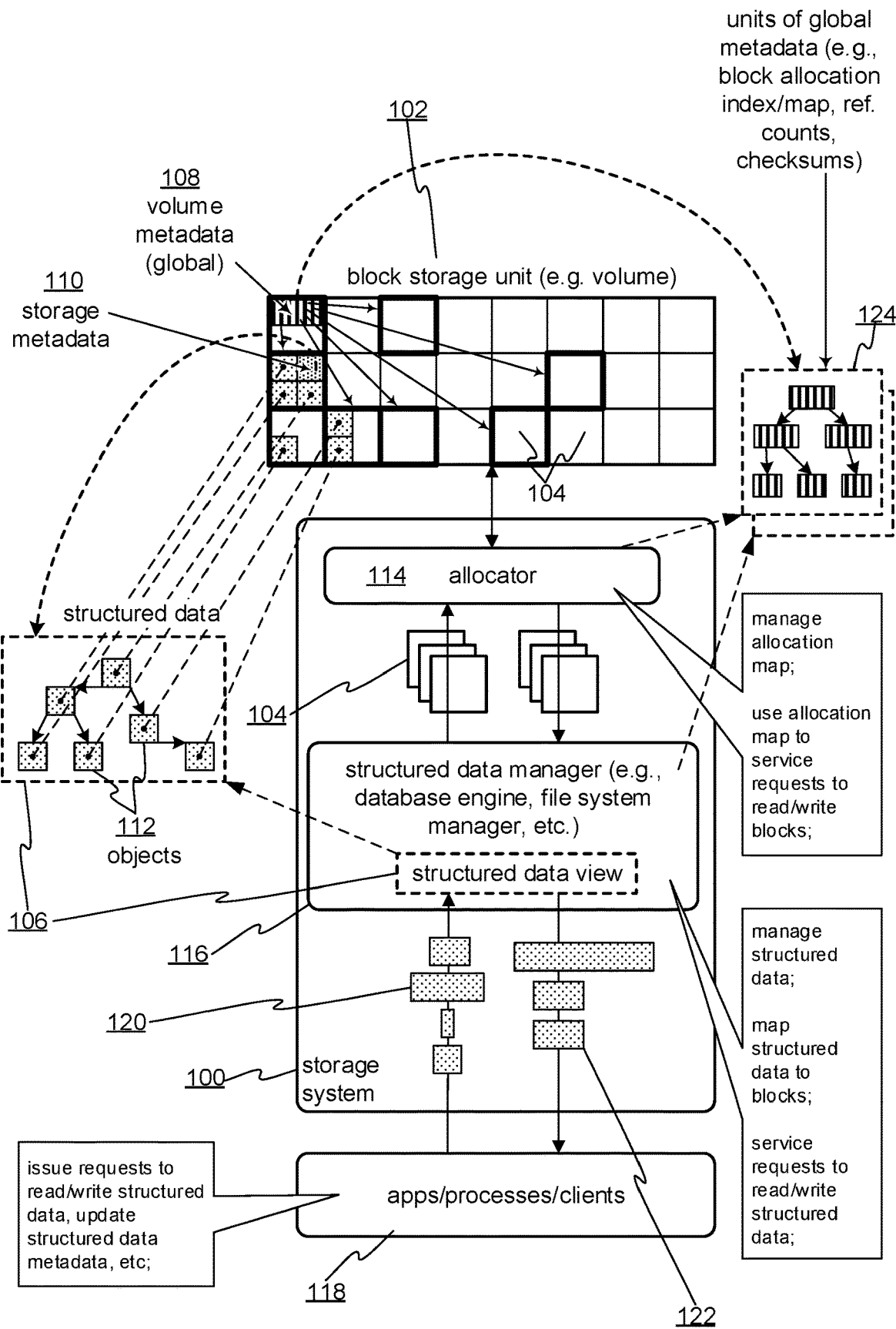
FIG. 1 shows an example storage system.

FIG. 1 shows an example storage system 100. The storage system 100 controls and accesses a block-based storage unit 102, which is segmented into blocks 104. Generally, the storage system 100 communicates with the storage unit 102 by passing in entire blocks 104 to be written and by requesting and receiving entire blocks 104 read from the storage unit 102. Blocks may be tracked by identifiers, offsets, etc. For discussion, blocks will be considered to have unique identifiers in a range or namespace (or key space) that fully describes the blocks of the storage unit 102. However, any scheme for block identification can be used.

The storage system 100 uses the blocks 104 as a coarse unit of storage, and manages storage of more granular independently structured data 106 within the blocks 104. Typically, the overlay of structured data 106 starts with global metadata 108 that the storage manager 100 is configured to read and interpret. As noted above, the global metadata 108 might include information about the structured data 106 as a whole, information about the storage unit 102 such as sizes of blocks, overall size or number of blocks, layout, amounts of free and used space, sub-units of global metadata (or pointers thereto) such as an allocation tree/index or reference count tree. Global metadata 108 might also point to storage metadata 110 that organizes the structured data 106, for instance, by indicating locations of objects 112 managed by the storage system 100, relationships between the objects 112, perhaps locations of properties of the objects, and so forth. In short, the structured data 106 including objects 112 and storage metadata 110 are used by the storage manager 100 to manage the "user" data (content) stored in the storage unit 102, and the global metadata 108 is used to maintain related global information. As will be seen, there are usually some functional relationships between the global metadata and the structured data.

The storage system 100 may include a storage allocator 114 and a structured data manager 116. The structured data manager 116 ("data manager") is the primary logic of the storage system 100 and provides a level of data abstraction atop the blocks 104 of the storage unit. The data manager 116 is configured with logic to interpret the storage metadata 110 and objects 112 and structure the structured data while handling requests from clients, applications or other entities 118 that interface with the storage system 100. Typically, clients issue, via a corresponding application programming interface (API) of the storage system 100, requests 120 directed to one or more of the objects 112. Requests 120 might be for updating the content of objects, deleting objects, reading the content of an object, reading or modifying the properties of an object, querying object metadata and global metadata (e.g., how much space is free on the storage unit 102), moving objects, creating new objects, and so forth. The data manager 116 translates between the high level requests 120 and the lower-level data stored in the blocks 104, and updates the objects 112, storage metadata 110, and global metadata 108 by reading and updating blocks 104. The data manager 116 returns responses 122 such as indications of success or failure, requested data such as objects 112 or properties thereof, etc.

The allocator 114 performs block allocation functions for the storage system 100, and in particular for the data manager 116. The allocator 114 accesses and maintains a unit of global metadata that will be referred to as an allocation map 124 (or, "allocation index"). The allocation map 124 can be accessed either by finding the location of its root in the global metadata 108, or by accessing a predefined location of the storage unit 102. The allocation map 124, is used to store the global allocation state, that is, information indicating which of the blocks 104 are logically considered to be in use (allocated) which and which blocks are logically considered to be available for use (not allocated).

It should be noted that implementation of the allocator 114 and data manager 116 as distinct components of the storage system 100 is a design convenience and is not significant for operation of the storage system 100, whose functions can be organized in many ways. Moreover, as noted above, the storage system 100 can be a file system manager, a database engine, or any other of type of data abstraction layer. The objects 112 might be files, directories, records, tables, etc.

Figure 2:
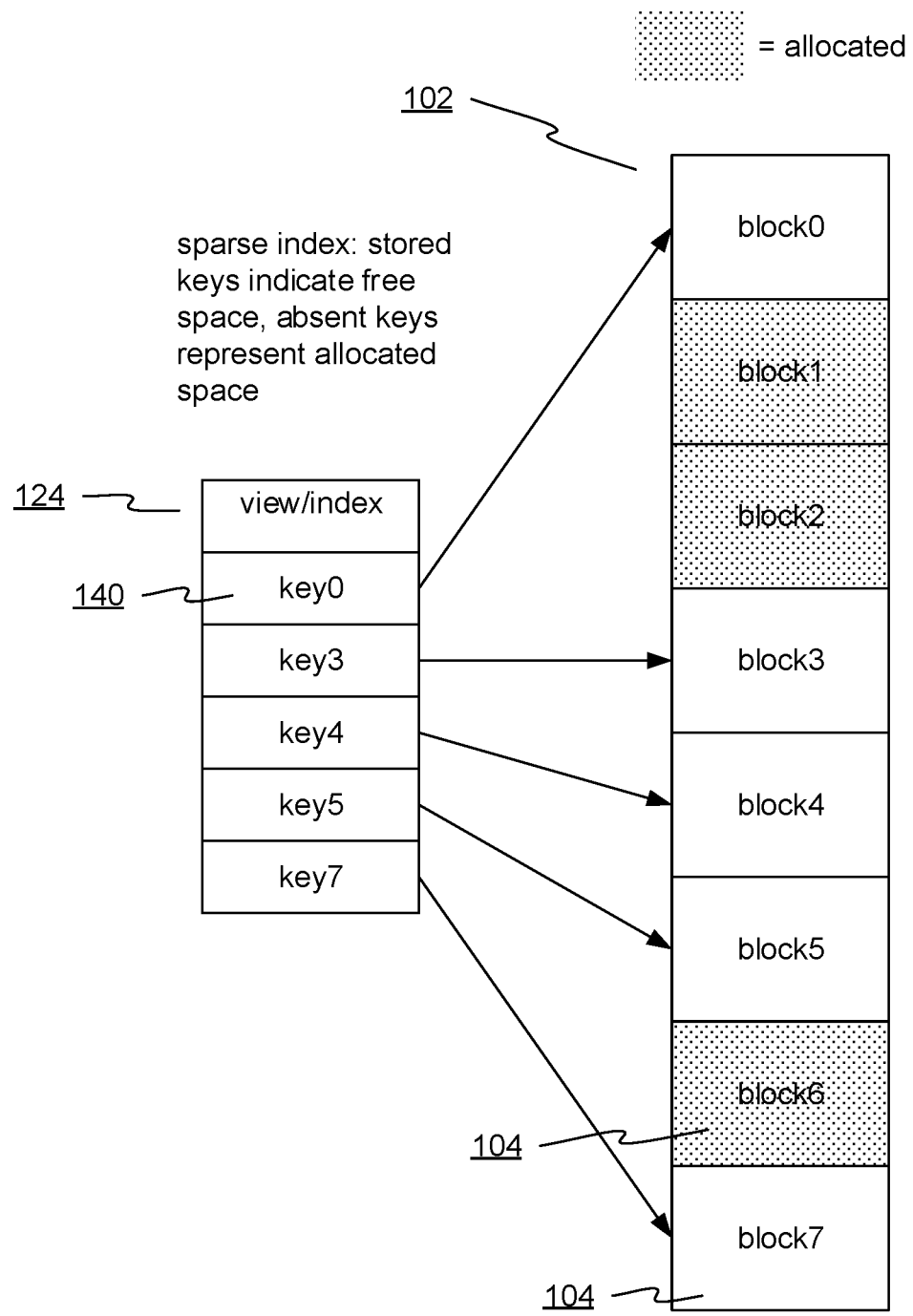
FIG. 2 shows how an allocation map or index can be implemented as a sparse data structure.

FIG. 2 shows how an allocation map or index can be implemented as a sparse data structure. In FIG. 2, the keys 140 are generic elements in an address space or namespace. For example, the keys could be block numbers or identifiers, page numbers, offsets (in bytes) from the start of the corresponding storage unit (i.e., byte addresses), block extents, or any other type of information that can be used to represent and identify all of the blocks in the relevant storage unit. A sparse map is one in which keys that are not explicitly stored in the map or index are logically treated as present in the map. In the example of FIG. 2, blocks 1, 2, and 6 do not have keys in the allocation map 124 and are therefore considered to be implicitly indicated (through their absence)

as "allocated". If the map is searched for a key and the key is not found, key is treated by the storage system as being "present" in the map.

Figure 3:
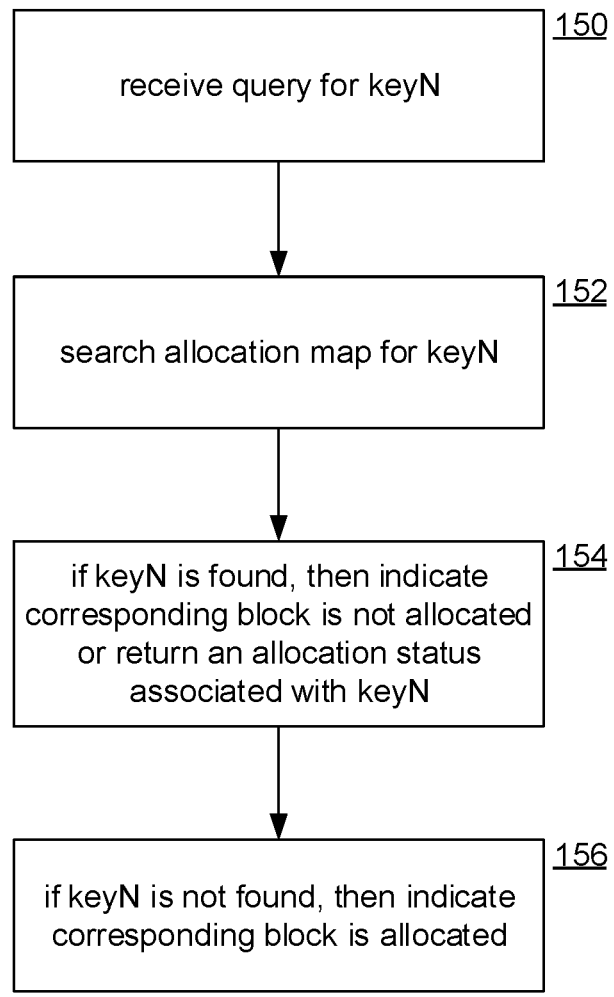
FIG. 3 shows a process for searching a sparse allocation map.

FIG. 3 shows a process for searching a sparse allocation map. If at step 150 the allocator 114 receives a query for keyN for example, at step 152 the allocator 114 searches the allocation map 124 for keyN, perhaps traversing a search tree or other type of data structure until the search algorithm determines whether keyN is present in the allocation map 124. If the search key keyN was found, then at step 154 the allocator 114 returns an indication that the corresponding block is not allocated (or alternatively, the allocation state of the block may depend on a value associated with keyN, such as a bit in a bitmap). If the search key keyN was not found, then at step 156 the allocator 114 returns an indication that the corresponding block is already allocated. In sum, the idea of a sparse search index is that keys not explicitly represented in the index are considered to be present in the index, which, among other benefits discussed below, results in a more compact index.

Figure 4:
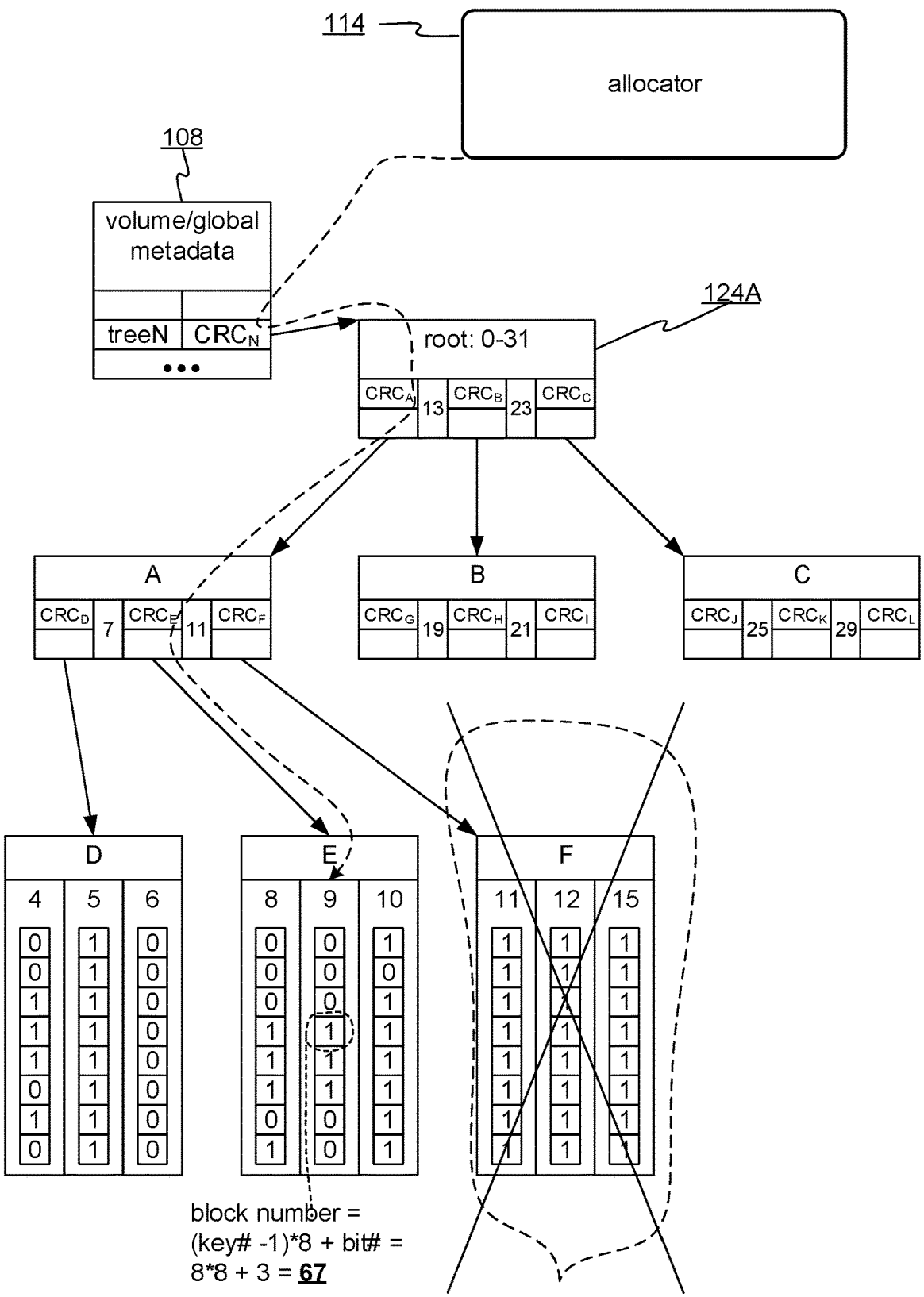
FIG. 4 shows an example sparse B+ tree for implementing an allocation map or index.

FIG. 4 shows an example sparse B+ tree 124A for implementing an allocation map or index. The namespace (or key space) of the example in FIG. 4 is represented as a combination of keys and bit numbers. Each key/leaf represents a chunk of blocks and stores a bitmap whose bits respectively represent the allocation states of the respective blocks in the chunk. In the example of FIG. 4, each chunk is 8 blocks/bits. Each key-bit combination is a unique entry (block number) in the namespace of all of the blocks in the corresponding storage unit. In the example of FIG. 4, assuming zero-based indexing, the 4th bit (bit #3) in the bitmap of key 9 represents block number 67; ((9−1)*8)+(3).

B+ trees are well-known data structures, and algorithms for constructing and maintaining non-sparse B+ trees are known and, as described herein, can be adapted to implement sparse B+ trees. The sparse B+ tree 124A is searched in the same way other B+ trees are searched. Assuming that the presence of block number 67 is being queried, the bitmap for block number 67 would be stored at a leaf having key 9. Starting at the root node (possibly found by reading a piece of global metadata 108), key 9 is compared with the key values 13 and 23 in the root node to select which child node to search. Since 9 is less than key value 13 in the root node, the child to the "left" 13 in the root node is followed and node A is then searched. Since the search key 9 is between key values 7 and 11 in node A, the middle child—node E—is then searched and key 9 is found. The bitmap of key 9 is read and the 4th bit is found to be "1", indicating that block number 67 is currently allocated. If block number 66 had been searched, the 3rd bit in key 9's bitmap is "0", and block number 66 would be treated as not currently allocated. If a leaf key or node's bitmap reaches a state indicating that all corresponding blocks are allocated, then the key or node is deleted, as indicated by node F.

Other addressing schemes can be used in conjunction with a search tree. For example, as shown in FIG. 5, leafs can store extents rather than bitmaps. Node D in FIG. 5 has the same information as node D in FIG. 4, but the bits set to "1" are described by extents rather than bitmaps. Each extent represents a run of allocated blocks. Linked lists might also be used to represent blocks. For ease of discussion, repair techniques will be described with reference to generic "keys" with the understanding that keys map to individual blocks. Extents, bit numbers, or other fine-grained block-identifying information may be assumed. In another embodiment, each block number is represented as a complete key in a B+ tree leaf.

Figure 6:
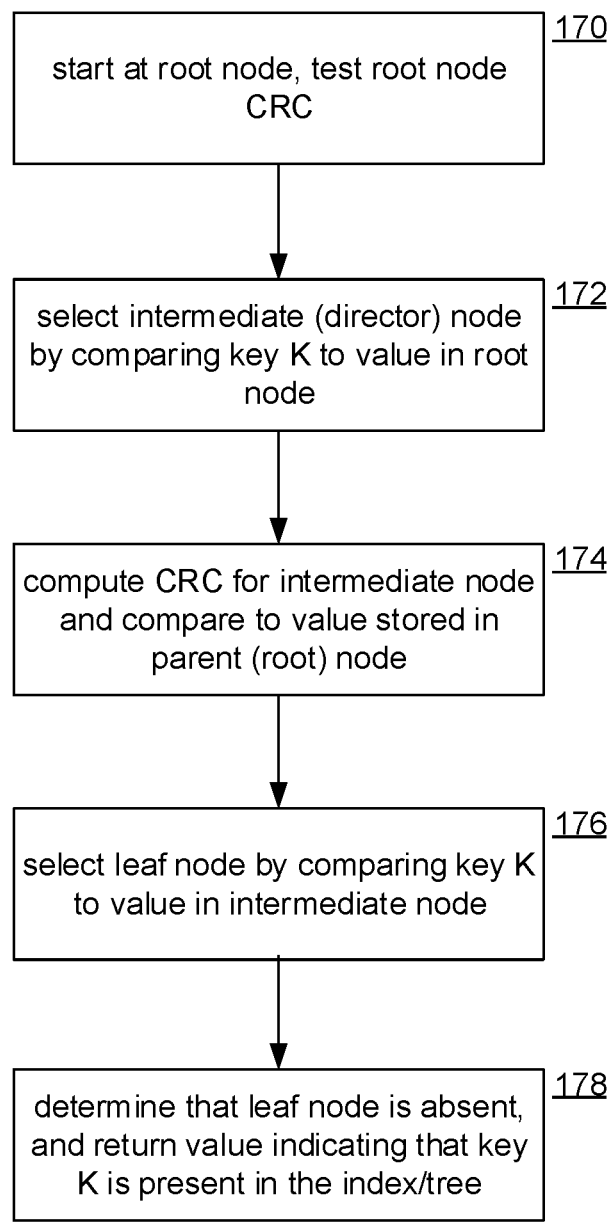
FIG. 6 shows how integrity values of an allocation map can be calculated and used to avoid data corruption.

FIG. 6 shows how integrity values of an allocation map can be calculated and used to detect data corruption. As shown in FIG. 4, integrity values can be stored for each element of an allocation map/index, or for any arbitrary portions of an allocation map. For discussion, checksums, in particular cyclic redundancy checks (CRCs) will be used as exemplary integrity values. However, other types of integrity code can be used, for example error correction codes, hash functions, and others.

Each integrity value, denoted as $CRC_N$ in FIG. 4, corresponds to a different portion of the allocation map. In the case of a B+ tree, each tree node has a CRC that is computed over the node and is stored in its parent node. Each node stores the CRCs of its children nodes in association therewith. For other types of allocation maps or indexes, different sub-units thereof may be checksummed in any way that covers the structural and substantive content of the allocation map. The CRC of a node may be computed for the entire content of the node, including at least its child pointers, keys, and in the case of leaf nodes, its substantive content (items). The integrity values are kept current as the B+ tree is updated. For instance, if a bit is changed in the bitmap of key 9, then the CRC for node E ($CRC_E$) is recomputed and is stored in parent node A. Because node A has changed (new value of $CRC_E$), $CRC_A$ must also be recomputed, and so on up to the root node. CRCs must similarly be recomputed when nodes are added, removed, updated, merged, split, etc.; any change to the content of a node results in recomputation of the affected CRCs.

Returning to FIG. 6, when the allocation map is to be searched for some key K, at step 170 the root node's integrity is tested. The CRC of the root node may be stored in a separate item of global metadata ($CRC_N$ in FIG. 4). The current CRC of the root node is computed and compared to the stored root $CRC_N$, and if they are equal the search proceeds as normal by, at step 172, selecting the appropriate child node for the key K (e.g., node A). At step 174 the integrity of the selected child/intermediate node is checked by computing the CRC of the child node and comparing it to the CRC stored in the parent/root node (e.g., $CRC_A$). This checking continues recursively until at step 176 a leaf node is determined to not exist for key K, in which case the search returns an indication that key K is present. If a leaf node does contain Key K, then the integrity of the leaf node is similarly checked.

In another embodiment, an additional global structure is maintained to track which blocks in a storage unit have integrity values (e.g., checksums) and which do not. Such a checksum structure has similar sparse-representation behavior as the sparse allocation maps described herein, in that a missing range implies that all of the blocks in the missing range have checksums. Although the data represented/indexed differs, the same techniques described herein for implementing a sparse allocation map may be used to implement a sparse checksum map or index. In one embodiment, blocks can be allocated but have no checksums, though if a block has checksums it must also be allocated.

Figure 7:
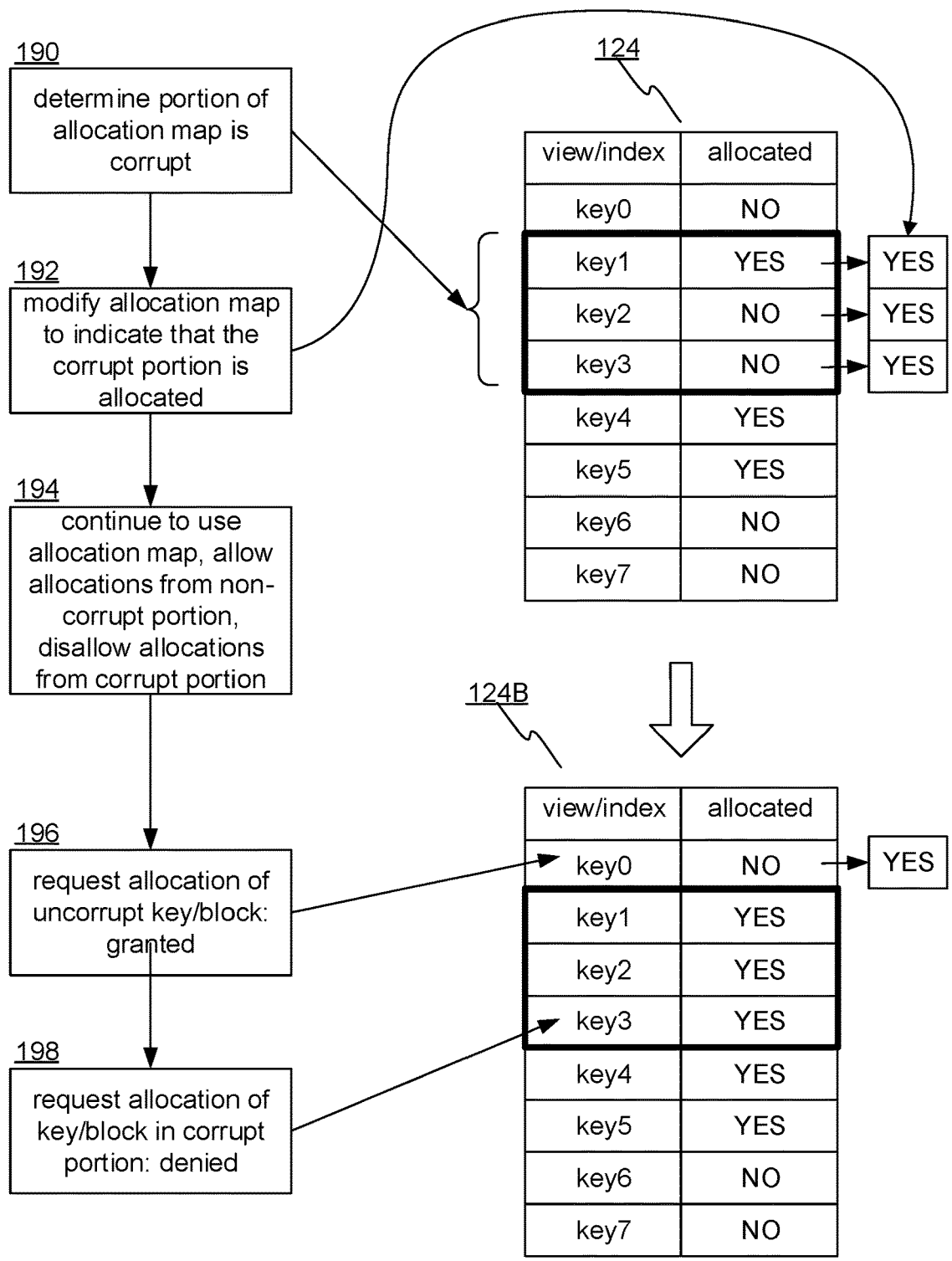
FIG. 7 shows how an allocation map of a storage unit can be repaired while remaining in use for servicing an online storage unit.

FIG. 7 shows how an allocation map 124/124B of a storage unit can be repaired while remaining in use for servicing an online storage unit. The process of FIG. 7 may be performed by a storage system. The allocation functions discussed with reference to FIG. 7 may be related to allocations for any type of data to be stored or queried, including global metadata, user data, structured data objects, storage metadata, or any other allocation request by the storage system.

At step 190 there is a determination that a portion of the allocation map is corrupt (bold portion of the allocation map 124). The portion may be identified by any information, such as inconsistent or erroneous structure of the allocation map, failure of the backing media, failure of an integrity value, etc. In the case of a search tree, a corrupt sub-tree might be detected, as explained above. Any indication that a subspace of the index/name space is corrupt is sufficient.

At step 192, the allocation map 124 is modified or supplemented (allocation map 124B) to indicate that the corrupt portion is allocated. That is, in any way suitable for the type of allocation map being used, the blocks represented by the corrupt portion of the allocation map are taken out of the pool of blocks considered to be unallocated. For a sparse type of allocation map, where keys that are not present in the map are logically treated as allocated, step 192 can involve merely logically deleting any keys (or key range/extent) in the corrupt portion. If a B+ tree is used, then the corrupt node may be deleted or flagged. If the node is an intermediary node, then the sub-tree of which it is the root is naturally deleted and the corresponding part of the namespace associated with the corrupt node becomes effectively allocated. In the example of FIG. 7, the portion of the allocation map from key1 to key3 would be deleted. Or, for the example shown in FIG. 4, if node A were found to be corrupt, it would be deleted, and then all of the keys for node A's key space—0 to 13 per the root node—would be considered to be allocated. All of the blocks represented by the bitmaps in nodes D and E, including those previously set to "0" (free) would all become implicitly allocated. Because a portion of the allocation map is corrupt, it may not be possible to know exactly which keys are affected, so in practice, all keys potentially present in the corrupt portion are to be considered as allocated. A corrupt portion may be a range of all keys from the lowest possible corrupt key to the highest possible corrupt key (e.g., the range of the keys in a B+ tree node).

To track the corrupt portion of the allocation map for later off-line reconstruction, the parent node of the deleted node may be updated with a marker to indicate that the child node was deleted. For example, in FIG. 4, the child pointer for node A could be changed from pointing to node A (a location of node A) to having a pre-defined value such as null, −1, etc., which by convention indicates a corrupt child. Such a marker can be detected when an off-line repair process walks the allocation tree, which in turn can trigger an off-line re-build of the allocation map. Alternatively, a flag in the relevant global metadata can be set to indicate that the allocation map is in need of repair, and when the storage unit is offline a repair can be undertaken.

If a non-sparse allocation map is being used and explicit allocations are tracked (non-allocated blocks are not described in the map), other modifications can be used. For instance, the corrupt range can be marked as reserved (no new allocations can be granted), or, as another form of reservation, the state can be overwritten in-place to make it consistent. These operations can be performed either directly, on top of the structure, or stored in other structures which would are used as indirection layers. However, because the allocation map is known to be corrupt, any technique to repair the allocation map should avoid a need to allocate blocks, since a block storing data might be erroneously allocated for the repair; actual data in the block could be over-written. For example, a portion of the relevant storage unit can be reserved (pre-allocated) for the purpose of tracking allocation map corruptions. This technique can also be used for sparse allocation maps, and can allow a record of the corrupt portion of the allocation map to be stored and later used for off-line repair of the allocation map by using metadata to reconstruct the underlying data and identify the blocks that it is stored on. For instance, if the storage system is a file system manager, then the file system can be reconstructed in a read-only mode to identify all of the allocated blocks and capture that into a new allocation map.

At step 194, while the relevant storage unit and its structured data remains online, the modified or supplemented allocation map 124B continues to be used. At step 196, if the allocator 114 receives a request for a block allocation, a key/block from the non-corrupt portion of the modified/supplemented allocation map 124B is selected and then marked as allocated (e.g., key0). If the allocator receives a query about key5, the allocator answers that key5 is allocated. If the allocator receives a query about key6, the allocator indicates that key6 is not allocated. Thus, even though the modified/supplemented allocation map 124B is corrupt, it continues to be fully functional. At step 198, if allocation of key3 is requested, the allocator denies the request, even though, prior to the corruption, key3 had been unallocated. As can be seen, treating a portion of the allocation map 124/124B as being allocated due to its having been corrupted may take some empty blocks out of circulation but it also allows an online repair to keep the allocation map in service.

Moreover, any type of allocation map may be used. Sparse indexes will be convenient to use. When an allocation map is implemented in a way in which portions of the allocation map are considered to be implicitly allocated, then it becomes possible to prune part of the allocation map. In short, when a portion of the allocation map is found to be corrupt, the corrupt portion is updated or supplemented so that the affected portion of the allocation map effectively becomes protected from being newly allocated.

Figure 8:
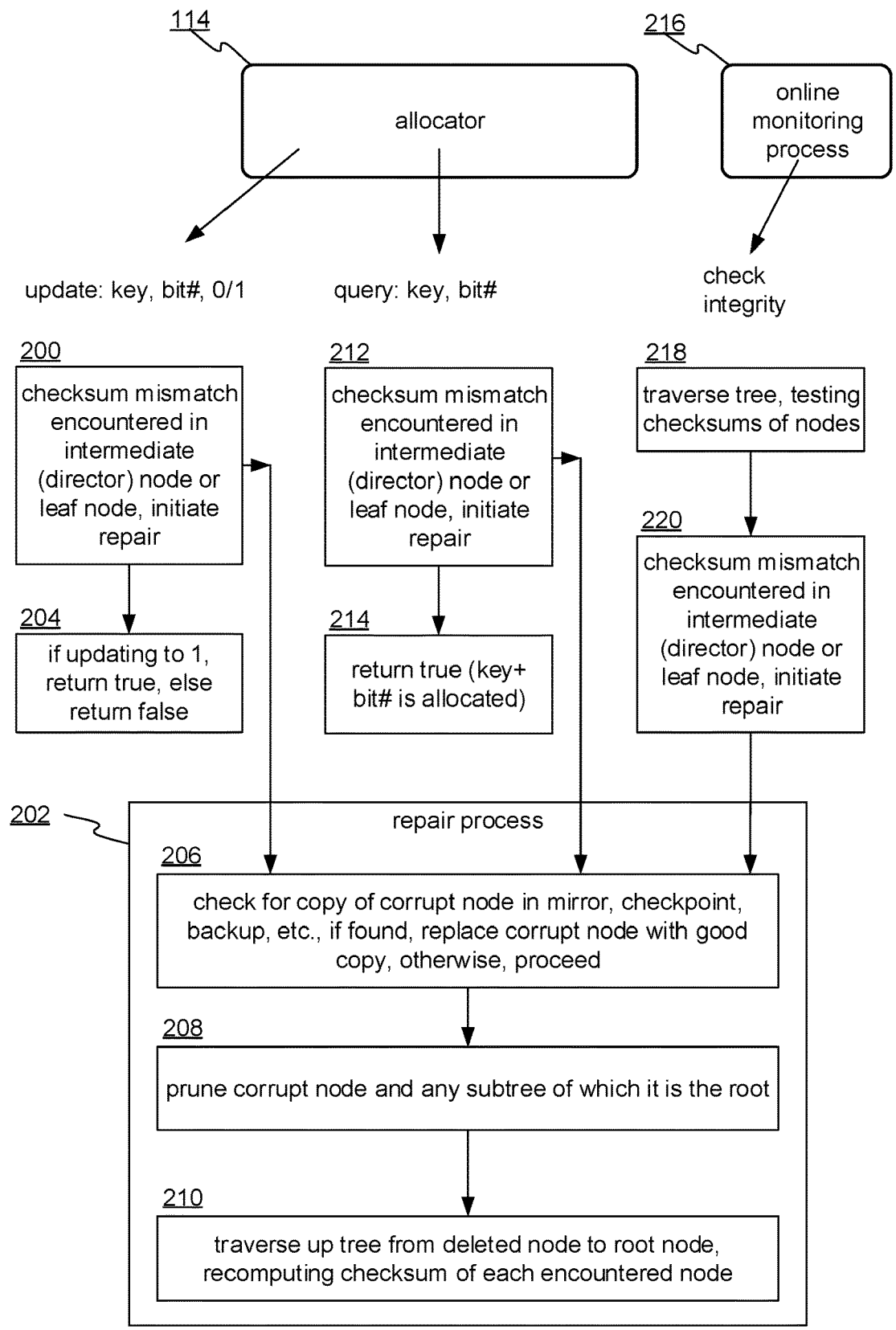
FIG. 8 shows another allocation map repair process.

FIG. 8 shows another allocation map repair process. The processes in FIG. 8 may be performed while the relevant storage unit remains online. For instance, a file system or database may be online throughout all of the steps shown in FIG. 8. When the allocator 114 receives a request to update a given key, at step 200 a checksum mismatch is detected while searching the allocation map. A repair process 202 is invoked, and, depending on the result and the type of update, at step 204 success or failure is returned. The repair process 202 may include an initial step 206 of seeking a copy of the corrupt portion of the allocation map. For instance, a mirror or RAID drive, a backup, a checkpoint, or any other source storing a copy of the corrupt portion can be accessed and used to overwrite the corrupt portion of the allocation map. If this is successful, then the update operation is allowed to proceed as normal and success is returned. However, if no backup data is available, then at step 208 any of the previously described techniques for isolating the corrupt portion of the allocation map are used. At step 210 the integrity values are updated, if needed. If the update was to set a key to "allocated" ("1"), then the update request can be answered at step 204 as true/successful.

Similarly, if the allocator 114 receives a request at step 212 to query a key, and corruption is detected, then the same repair process 202 is invoked. At step 214, if the copy-based repair at step 206 was successful, then the return value depends on the key's value in the copy. If the copy-based repair at step 206 was not successful, then in accordance with the repair step of causing the corrupt portion of the allocation map to be all "allocated", the query is answered as "true", i.e., the queried key/block is treated as allocated, regardless of the pre-corruption ground-truth state of the key/block.

FIG. 8 also shows a monitor process 216. Although it is possible to check the integrity of the allocation map during ordinary allocation-related operations directed to the allocation map, alternatively or additionally, integrity-checking scans can be performed independent of allocation-related activity by scanning the allocation map (e.g., walking a B+ tree). At step 218 the allocation map is traversed. At step 220, if a corruption is found, the repair process 202 is invoked.

In one embodiment, it might be useful to use some of the global metadata to help update a sparse allocation map. The global metadata might indicate the size of the relevant storage unit or volume. As such, when the allocation map is found to be corrupt, the global metadata can be used to understand what the complete namespace is for the allocation map. That is, the range of the allocation namespace can be derived from the global metadata. Thus, if there is corruption near the upper bound of the allocation namespace, the allocation map can be updated to indicate that blocks from the lowest point of the corruption up to the maximum block name or key is in an allocated state.

In general, any data that a storage system can use that contains partial or complete (redundant) information about another global structure can be used to fix identified corruption. The type of data (or partial information) used will depend on the particular storage system. In the case of an allocator, there may be another table, such as a container table, that stores how many blocks are allocated in a given region of the relevant storage unit. If the container table states that all clusters are free within a given region, then there is no need to "leak" the space in that region of the allocator, everything in the corrupt range can be essentially marked as allocated, except for the range described as entirely free in the container table.

For counting to blocks (reference counting in general is discussed next), if a region is corrupt, the entire region can be described as having a maximum reference count. However, it may be known that individual subranges within the corrupt range are marked as free in the allocator, in which case a reference count of zero can be stored for the ranges and the maximum reference count can be set only for the ones that are marked as allocated in the allocator structure.

In some cases the entire structure can be rebuilt with minimal or no additional information, if the end state of the system remains consistent. For example, if a table which stores the last mount time and a few additional volume-specific parameters (e.g. enable/disable certain features), if the structure becomes corrupt, it can be recreated and populated with default values, potentially losing the original semantic, but keeping the volume online.

These are just a few examples of how the efficiency/quality of a repair can be improved when additional information can be derived from other structures.

Figure 9:
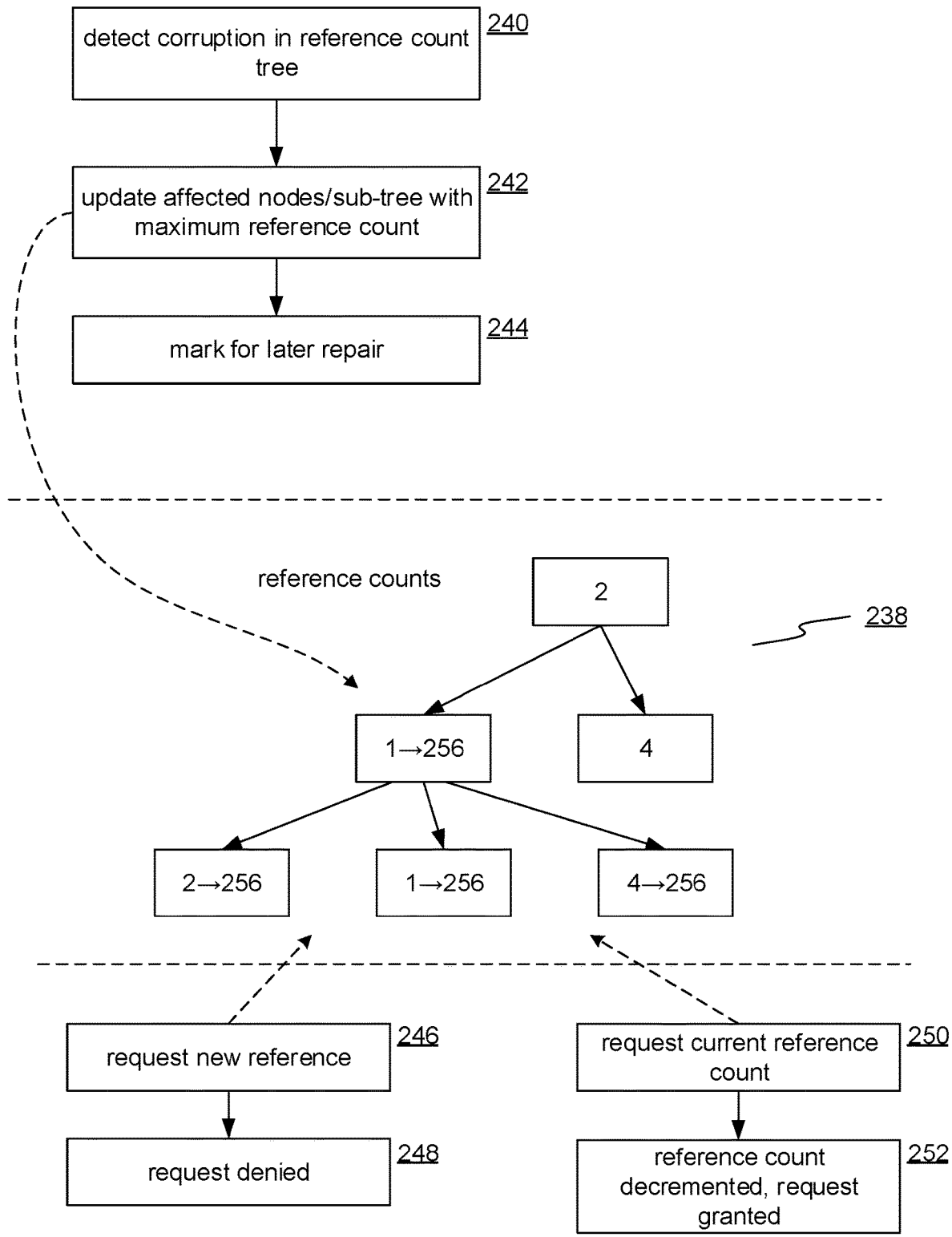
FIG. 9 shows a repair technique for handling a corrupt reference count tree.

FIG. 9 shows a repair technique for handling a corrupt reference count tree 238. Many storage systems keep track of how many references are currently open for stored objects. For example, for a file system, the number of references to respective files may be tracked. If the storage system is a database, the reference counts may be tracked for references to tables, records, or other objects. Reference counts may be stored in a separate tree or data structure, or in the storage metadata that organizes the referenced objects (e.g., a file system tree). Any of the corruption detection techniques described above may be used. At step 240 a corruption in the reference count data is detected. At step 242 the reference counts in the affected portion are all set to a maximum reference count value, and at step 244 the reference count data is flagged for later offline repair.

If a non-sparse reference count data structure is used, for instance a B+ tree, where only the blocks, objects, files, etc. that have active references are represented, repair may require that the entire potentially corrupted portion of the reference count namespace be updated. That is, if a node is found to be corrupt, because the entire node's sub-tree must be considered corrupt, it may not be sufficient to merely update existing nodes. Rather, the maximal range of potential corruption is determined, and the reference count tree 238 is updated to explicitly add representation for the relevant range of key space corruption. New nodes may need to be inserted with values that fill out the corrupt range such that each key in the corrupt range has a maximum reference count.

Returning to FIG. 9, once the reference count tree 238 is repaired, some reference-count related operations may proceed normally or with results that are helpful for requestors. For example, if at step 246 a client requests a new reference, then at step 248 the storage system determines that the maximum references have been reached and denies the request for a new reference. Although some functionality may be lost, the relevant storage unit continues to be available. If, at step 250, a client requests that a particular key's reference count be decremented, for instance when closing a file descriptor, then the system is able to safely decrement the reference count and at step 252 inform the client that the request was completed.

Although reference counts to file system objects have been described above, the same techniques can readily be extended to counting references to blocks of a file system.

Figure 10:
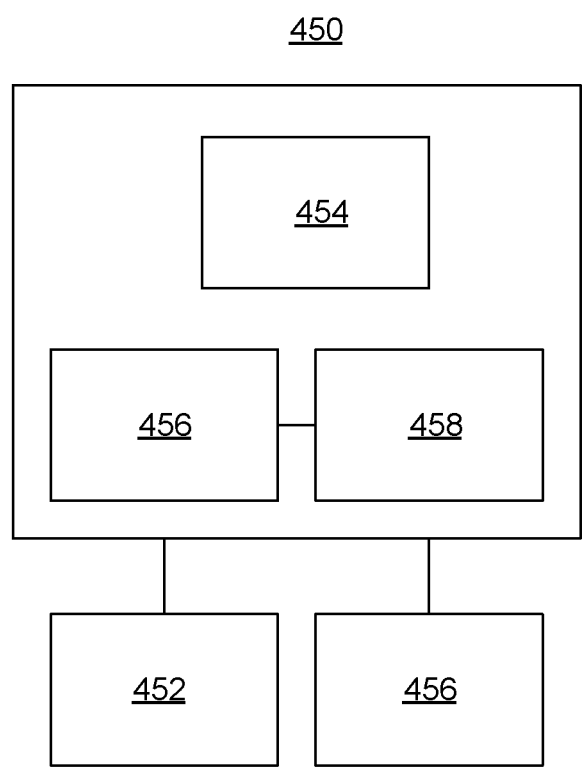
FIG. 10 shows details of a computing device.

FIG. 10 shows details of a computing device 450 on which embodiments described above may be implemented. The technical disclosures herein constitute sufficient information for programmers to write software, and/or configure reconfigurable processing hardware (e.g., FPGAs), and/or design application-specific integrated circuits (ASICs), etc., to run on one or more of the computing devices 450 to implement any of features or embodiments described in the technical disclosures herein.

The computing device 450 may have a display 452, a network interface 454, as well as storage hardware 456 and processing hardware 458, which may be a combination of any one or more: central processing units, graphics processing units, analog-to-digital converters, bus chips, FPGAs, ASICs, Application-specific Standard Products (ASSPs), or Complex Programmable Logic Devices (CPLDs), etc. The storage hardware 456 may be any combination of magnetic storage, static memory, volatile memory, non-volatile memory, optically or magnetically readable matter, etc. The meaning of the term "storage", as used herein does not refer to signals or energy per se, but rather refers to physical apparatuses and states of matter. The hardware elements of the computing device 450 may cooperate in ways well understood in the art of computing. In addition, input devices may be integrated with or in communication with the computing device 450. The computing device 450 may have any form factor or may be used in any type of encompassing device. The computing device 450 may be in the form of a handheld device such as a smartphone, a tablet computer, a gaming device, a server, a rack-mounted or backplaned computer-on-a-board, a system-on-a-chip, or others.

Embodiments and features discussed above can be realized in the form of information stored in volatile or non-volatile computer or device readable storage hardware. This is deemed to include at least storage hardware such as optical storage (e.g., compact-disk read-only memory (CD-ROM)), magnetic storage hardware, flash read-only memory (ROM), and the like. The information stored in storage hardware can be in the form of machine executable instructions (e.g., compiled executable binary code), source code, bytecode, or any other physical hardware having a physical state that can transfer information to processing hardware to enable or configure computing devices to perform the various embodiments discussed above. This is also deemed to include at least volatile memory such as random-access memory (RAM) and/or virtual memory storing information such as central processing unit (CPU) instructions during execution of a program carrying out an embodiment, as well as non-volatile media storing information that allows a program or executable to be loaded and executed. The embodiments and features can be performed on any type of computing device, including portable devices, workstations, servers, mobile wireless devices, and so on.

The invention claimed is:

1. A method performed by processing hardware and storage hardware, the method comprising:
    executing a storage system that manages structured data layered on a block-based storage unit, the structured data stored in blocks of the storage unit, the managing including maintaining an allocation map in one or more of the blocks of the storage unit to track which of the blocks in the storage unit currently have a been allocated for storing portions of the structured data;
    while the storage unit is online and while the structured data is online and accessible for updating the structured data via the storage system:
        using, by the storage system, the allocation map to allocate blocks for storing portions of the structured data and to deallocate blocks from storing portions of the structured data, wherein the using the allocation map to allocate blocks comprises (i) identifying, according to the allocation map, blocks that are free to be allocated to store portions of the structured data, and (ii) updating the allocation map to indicate that the identified blocks are allocated to store portions of the structured data;
        determining that a portion of the allocation map is corrupt, and based on the determining that the portion of the allocation map is corrupt, updating the allocation map to indicate that blocks corresponding to the corrupt portion of the allocation map are currently allocated to store portions of the structured data, which causes at least some blocks that are not storing portions of the structured data to be indicated in the allocation map as storing portions of the structured data.

2. A method according to claim 1, wherein the storage system comprises a file system manager, the structured data comprises a file system, the storage unit comprises a storage volume managed by the file system manager, and the map comprises either a checksum map that tracks which blocks have checksums or an allocation map that tracks which blocks have been allocated.

3. A method according to claim 1, wherein the storage system comprises a database engine, the structured data comprises a database managed by the database engine, the storage unit comprises a page file, and the map comprises an allocation map that indicates which blocks have been allocated for storing the database.

4. A method according to claim 1, wherein the allocation map comprises a sparse data structure that explicitly represents blocks that are not allocated to store portions of the structured data and implicitly represents blocks that are allocated to store portions of the structured data, wherein any blocks not explicitly represented in the allocation map are treated by the storage system as currently being allocated to store portions of the data structure.

5. A method according to claim 4, wherein the allocation map comprises a B+ tree, wherein the updating the allocation map to indicate that blocks corresponding to the corrupt portion of the map are currently allocated to store portions of the structured data comprises logically or physically deleting a node of the B+ tree, and wherein the deleting the node causes at least some blocks corresponding to the corrupt portion of the allocation map to be indicated as storing portions of the structured data when they are not actually storing portions of the structured data.

6. A method according to claim 1, wherein the allocation map comprises checksums of respective portions of the allocation map, and wherein the determining that the portion is corrupt comprises comparing a stored checksum of the portion with a computed checksum of the portion.

7. A method according to claim 1, further comprising storing an indication that the allocation map is in need of repair, and when the storage unit and/or the structured data is offline, using the structured data to construct a new allocation map for indication which blocks are allocated to store portions of the structured data.

8. A method according to claim 1, wherein the determination of corruption is made while the allocation map is being used to either query whether a block has been allocated to store a portion of the structured data, request a block be designated as being allocated to store a portion of the structured data, or a block be designated as not being allocated to store a portion of the structured data.

9. A method according to claim 1, wherein the allocation map tracks allocation of blocks for global metadata and storage metadata, the global metadata comprising properties of the storage unit, the storage metadata indicating the structure of the structured data.

10. A method according to claim 1, wherein when the storage system is configured to search the allocation map to determine if a key for a block is present in the allocation map, and the storage system is further configured to treat the block as being allocated to store a portion of the structured data if the key is not found in the allocation map.

11. A computing device comprising:
    processing hardware;
    storage hardware communicatively coupled to the processing hardware, the storage hardware comprising a storage unit segmented into blocks by a storage system, the storage hardware storing information configured to cause the processing hardware to execute:
        the storage system, the storage system configured to organize and maintain structured data by storing the structured data in the blocks of the storage unit, the storage system configured to manage the structured data by tracking which of the blocks have an attribute, the attribute comprising being allocated to store a portion of the structured data, the structured data comprising objects managed by the storage system;
        the storage system further configured to maintain a map on the storage unit and use the map when servicing e-requests from the storage system to (i) designate blocks as having the attribute, (ii) de-designate blocks as having the attribute, and (iii) query the attribute status of blocks, wherein the storage system maintains the map by updating the map to reflect designations and de-designations of blocks, the map comprising a description of keys of blocks of the storage unit;

the map;

integrity data comprising integrity values for respective portions of the map, each integrity value configured to be used to determine whether a respective portion of the map is corrupt; and the storage system further configured to, when servicing an allocation request, check the integrity of portions of the map with respective integrity values to identify a corrupt portion of the map, and based on identifying the corrupt portion, update the map to cause the map to indicate that a set of the blocks corresponding to the corrupt portion have the attribute.

12. A computing device according to claim 11, wherein the storage system comprises a file system, and the storage unit comprises a file system volume configured to be managed by the file system manager.

13. A computing device according to claim 12, wherein the map comprises an index of the blocks, and the storage system comprises an allocator configured to, when allocation blocks to store portions of the structured data, search the index for keys that identify blocks.

14. A computing device according to claim 11, wherein the storage system is further configured to compute a new integrity value for the map to enable checking of the integrity of the updated map.

15. A computing device according to claim 14, wherein the map comprises a tree comprising a parent node and a child node of the parent node, the corrupt portion comprises the child node, and the new integrity value corresponds to the parent node.

* * * * *